United States Patent
Nagara et al.

[11] Patent Number: 6,147,957
[45] Date of Patent: Nov. 14, 2000

[54] INFORMATION RECORDING/ REPRODUCING APPARATUS AND METHOD

[75] Inventors: Toru Nagara, Tokyo; Akio Terada, Kanagawa; Masamichi Kondo; Tadaaki Nomoto, both of Tokyo, all of Japan

[73] Assignee: Sony Corporation, Tokyo, Japan

[21] Appl. No.: 09/105,881

[22] Filed: Jun. 26, 1998

[30] Foreign Application Priority Data

Jul. 2, 1997 [JP] Japan ................................. 91-76689

[51] Int. Cl.⁷ .................................................. G11B 7/00
[52] U.S. Cl. ............................................ 369/116; 369/54
[58] Field of Search ................................. 369/13, 47, 48, 369/49, 50, 54, 58, 116, 124.1, 124.15

[56] References Cited

U.S. PATENT DOCUMENTS 5,530,688 6/1996 Hurst, Jr. et al. ........................ 369/116
5,732,061 3/1998 Kirino et al. ........................ 369/54 X

*Primary Examiner*—Paul W. Huber
*Attorney, Agent, or Firm*—Frommer Lawrence & Haug, LLP.; William S. Frommer

[57] ABSTRACT

The present invention relates to an information recording/reproducing apparatus that radiates a laser beam to an information recording medium for recording and/or reproducing information, comprising: a laser beam generating means for generating a laser beam that records information to or reproduces information from the information recording medium; a timing control means for controlling information recording timing so that a recording area on a track of the information recording medium is followed by another recording area in a partially overlapping manner; and a laser beam intensity control means for controlling an intensity of the laser beam generated by the laser beam generating means so that a first area with information recorded, a second area with information erased, and a third area with information neither recorded nor erased are formed in the recording area in which information is at least recorded in an overlapping manner.

11 Claims, 13 Drawing Sheets

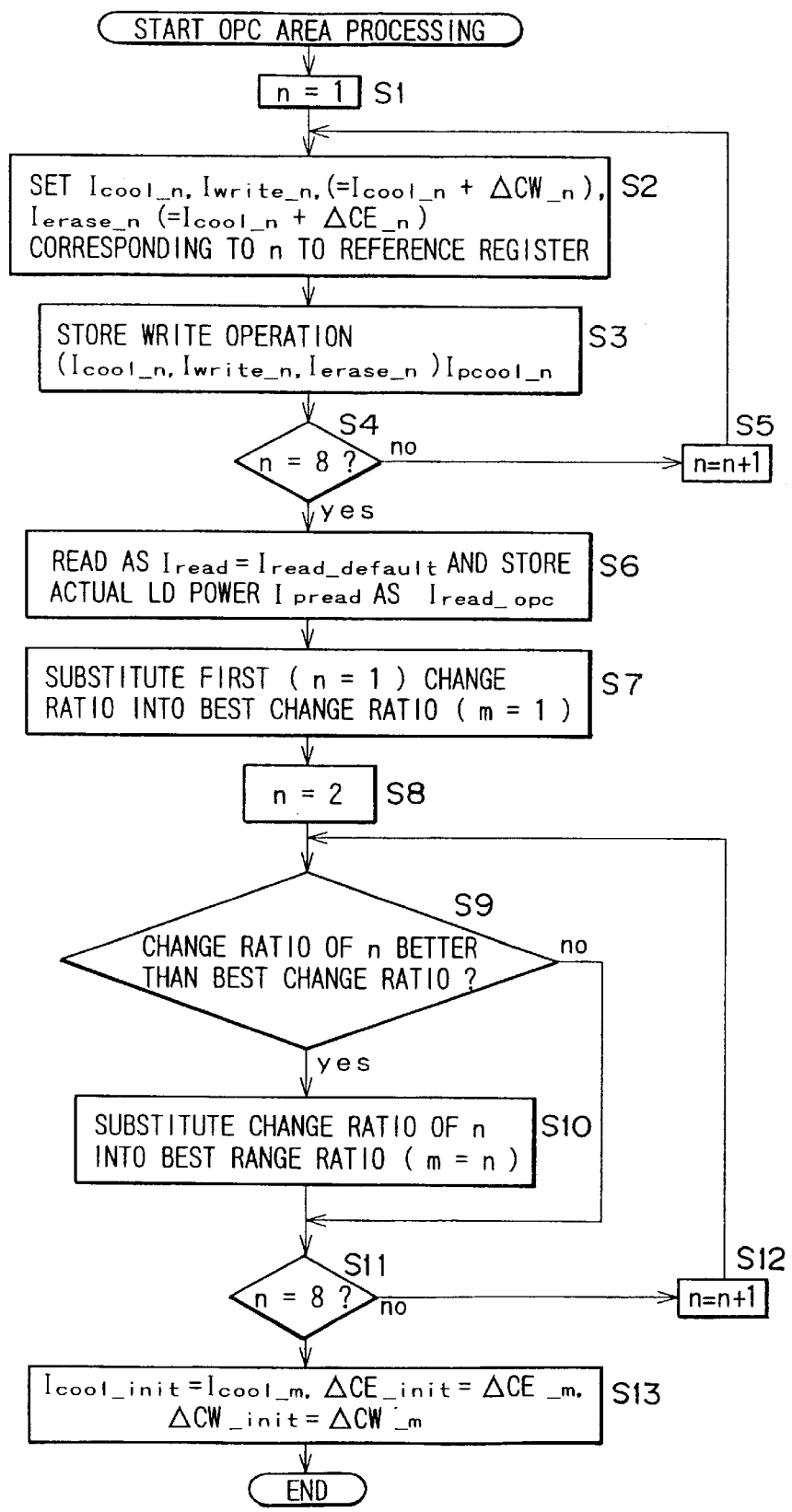

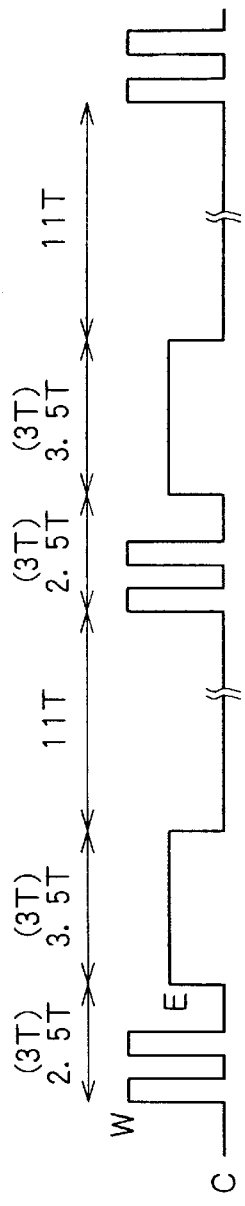

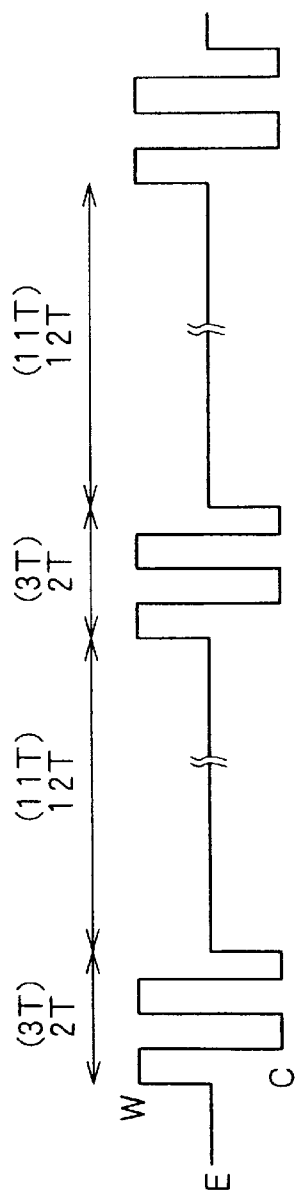
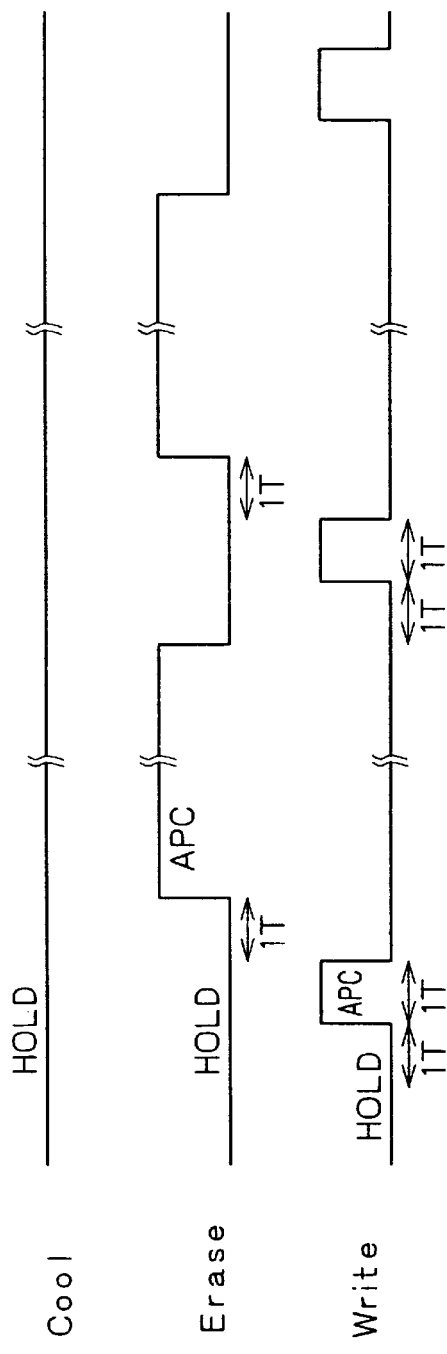
FIG. 6A
FIG. 6B
FIG. 6C
FIG. 6D
FIG. 6E

FIG. 7A

PATTERN1 | PATTERN2 4T, 4T | DATA | PATTERN 1 | PATTERN2 4T, 4T | DATA
ECC BLOCK (n) | ECC BLOCK (n+1)

FIG. 7B

POWER REFERENCE (n) | POWER REFERENCE (n+1)

FIG. 7C cool=apc    cool=hold    cool=hold    cool=apc    cool=hold    cool=hold
erase=apc   erase=apc    erase=hold/apc   erase=apc   erase=apc    erase=hold/apc
write=apc   write=apc    write=hold/abc   write=apc   write=apc    write=hold/apc

FIG. 7D  cool

FIG. 7E  erase

FIG. 7F  write

FIG. 7G  READ I$_{pcool\_n}$

FIG. 7H  READ I$_{pcool\_n+1}$

F I G. 8
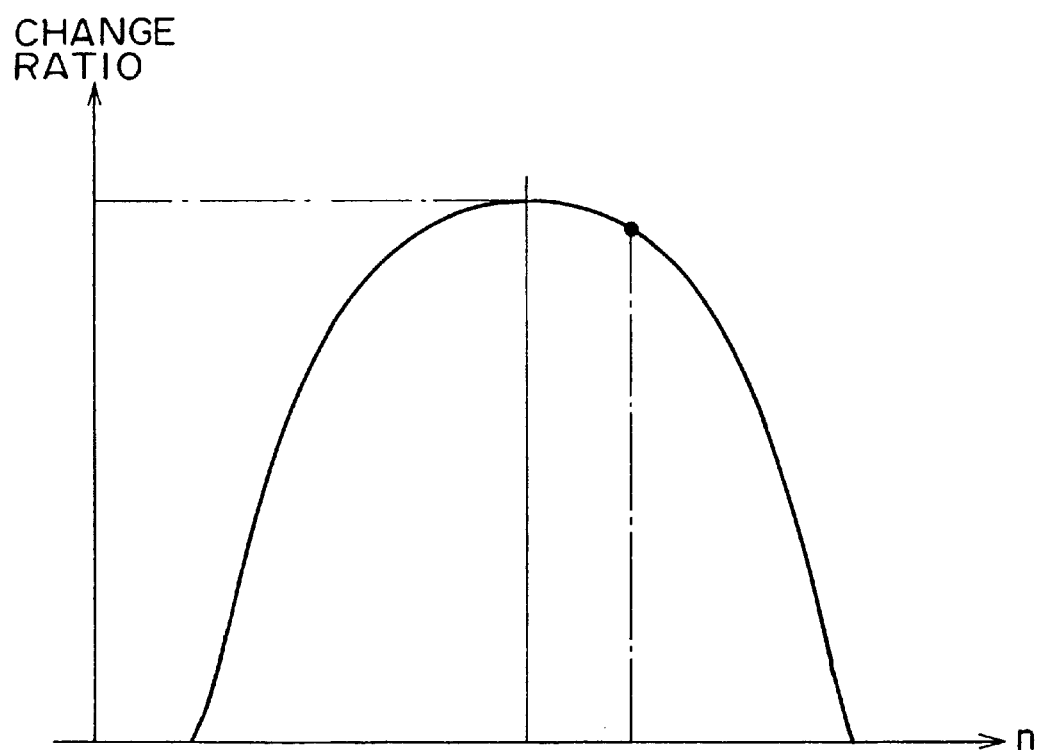

INFORMATION RECORDING/REPRODUCING APPARATUS AND METHOD

BACKGROUND OF THE INVENTION

The present invention generally relates to an information recording/reproducing apparatus, an information recording/reproducing method, and a transmission medium. In particular, the present invention relates to an information recording/reproducing apparatus, an information recording/reproducing method, and an information transmission medium that minimize damage to an information recording medium by recording a predetermined pattern when recording part of information in an overlapping manner.

Generally, two types of optical discs are currently available; a ROM disc dedicated to only reading information from it and a RAM disc allowing both recording (or writing) data to it and reproducing data from it. In the ROM disc, data is continuously recorded without interruption. Consequently, the ROM disc allows tracking control by DPD (Differential Phase Detection) that uses the edges along the length of each mark formed on the disc (it should be noted that the mark referred to herein includes a pit formed by a physical concavity).

As for the RAM disc, when no data is recorded on it, an area of a state in which no mark is formed on a data track (namely, there is no edge along the length of the pit) is formed. An optical disc apparatus for recording data to a RAM disc and reproducing data recorded on it normally uses a groove formed on the RAM disc so that tracking can be executed in a state in which no data is recorded. Tracking is executed by use of a sidewall of this groove (or a data track sidewall). With the ROM disc, which has no groove formed, the edge along the width of each mark serves as the sidewall of the groove. Therefore, the ROM disc can be loaded on an optical disc device designed for the RAM disc to execute tracking control for data reproduction.

However, loading a RAM disc having at least a section with no data recorded into an optical disc apparatus dedicated to the ROM disc and executing tracking by DPD make it difficult to correctly drive the RAM disc because this apparatus cannot execute tracking control in the section with no data recorded. To make the optical disc apparatus dedicated to the ROM disc also drive the RAM disc correctly, no section with data not recorded must be formed on the RAM disc.

In the RAM disc, data is recorded on an ECC block basis. When an ECC block is followed by another ECC block, the data of the preceding ECC block and the data of the succeeding ECC block are recorded in a partially overlapping manner. This prevents the forming of a section in which no data is recorded due to jitters or the like between these ECC blocks.

Namely, in the conventional RAM disc, a record mark having a length of 4 T and an erase mark having a length of 4 T are alternately recorded in the section in which data are recorded in an overlapping manner as shown in FIG. 13.

As described, the RAM disc is recorded with data in a partially overlapping manner. Consequently, repeatedly rewriting data doubles the number of times data are rewritten in the overlapping section over the number of times data are rewritten in other sections. This lowers the reliability in data rewriting in that section.

The section in which data are recorded in an overlapping manner normally provides an APC (Automatic Power Control) area. The laser power for data recording is adjusted based on the state in which data are written in that section. Consequently, if that section is damaged, it becomes difficult to set the laser power correctly.

Further, an OPC (Optional Power Control) area is formed on the innermost periphery of the optical disc. The APC area is also formed in this OPC area. The light intensity at the time when the use environment of the optical disc apparatus has changed is adjusted based on the data recording state in the APC area. Consequently, if the APC area is damaged, it becomes difficult to make an adjustment of the light intensity at the time when the use environment of the optical disc apparatus has changed.

SUMMARY OF THE INVENTION

It is therefore an object of the present invention to provide an information recording/reproducing apparatus and a method thereof that minimize a damage to an area in which data recorded in an overlapping manner.

In carrying out the invention and according to one aspect thereof, there is provided an information recording/reproducing apparatus comprising: a laser beam generator for generating a laser beam that records information to or reproduces information from the information recording medium; a timing controller for controlling information of recording timing so that a recording area on a track of the information recording medium is followed by another recording area in a partially overlapping manner; and a laser beam intensity controller for controlling the intensity of the laser beam generated by the laser beam generator so that a first area with information recorded, a second area with information erased, and a third area with information neither recorded nor erased are formed in the recording area in which information is at least recorded in an overlapping manner.

BRIEF DESCRIPTION OF THE DRAWINGS

These and other objects of the invention will be seen by reference to the description, taken in connection with the accompanying drawing, in which:

FIG. 4 is a flowchart describing processing in an OPC area;

FIGS. 5A through 5E are diagrams illustrating a format of pattern 1;

FIGS. 6A through 6E are diagrams illustrating a format of pattern 2;

FIGS. 7A through 7H are timing charts illustrating an operation for writing two consecutive ECC blocks;

FIG. 8 is a diagram illustrating a best change ratio;

DETAILED DESCRIPTION OF PREFERRED EMBODIMENTS

This invention will be described in further detail by way of examples with reference to the accompanying drawings. In order to clarify the relationship between the means of the invention described in the scope of the claims thereof and the following preferred embodiment, each of the means is followed by a corresponding embodiment (an example) in parentheses, describing features of the present invention. It should be noted, however, that this description is not limited to the described means.

An information recording/reproducing apparatus associated with the present invention comprises a light generating means (for example, a laser diode 11 of FIG. 1) for generating a light for recording information to an information recording medium or reproducing information from the same; a timing control means (for example, a servo circuit 5 of FIG. 1) for controlling an information recording timing such that a recording area on a track of the information recording medium is formed followed by another recording area in a partially overlapping manner, and an intensity control means (for example, the servo circuit 5 of FIG. 1) for controlling the intensity of the light such that a first area with information recorded, a second area with information erased, and a third area with information neither recorded nor erased are formed at least in the recording area in which the information is recorded in an overlapping manner.

Figure 1:
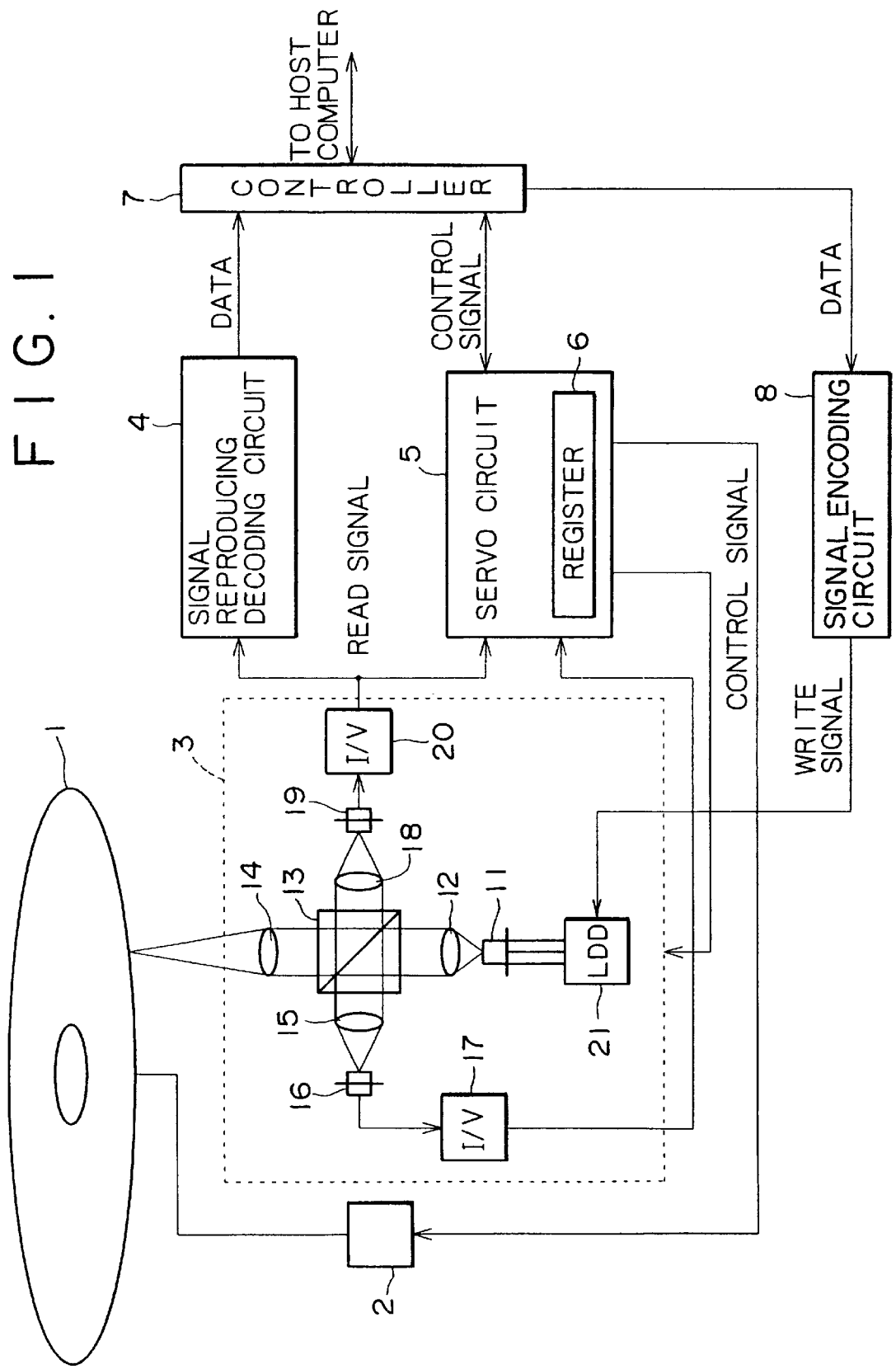
FIG. 1 is a block diagram illustrating a constitution of an optical disc apparatus to which an information recording/reproducing apparatus associated with the present invention is applied.

Now, referring to FIG. 1, there is shown an example of a constitution of an optical disc apparatus to which the information recording/reproducing apparatus associated with the present invention is applied. In the figure, a disk 1 is a phase change optical disk which is capable of rewriting data on it for a plurality of time and the disc 1 is rotated by a spindle motor 2 at a predetermined speed. An optical head 3 has a laser diode (LD) 11 which is driven by a laser diode driver (LDD) 21. A laser beam emitted from the laser diode LD 11 is converted by a collimator lens 12 into a parallel beam, which passes an objective lens 14 via a beam splitter 13 to be converged by the objective lens 14 for radiation to the disc 1. A reflected beam from the disc 1 is put into the beam splitter 13 via the objective lens 14 to be reflected. The reflected beam is converged by a lens 18 to be put into a photodiode (PD) 19. A current outputted from the photodiode PD 19 is converted by a current-tovoltage (I/V) converter 20 into a voltage signal, which is put into a signal reproducing/decoding circuit 4 and the servo circuit 5.

Part of the laser beam emitted from the LD 11 and put into the beam splitter 13 from the collimator lens 12 is reflected by the beam splitter 13 to be converged by a lens 15, the converged beam being inputted in the photodiode (PD) 16. The PD 16 outputs a current signal corresponding to the intensity of the laser beam emitted from the LD 11. This current signal is converted by the current-to-voltage (I/V) converter 17 to be inputted in the servo circuit 5.

The signal reproducing/decoding circuit 4 decodes the signal reproduced from the disc 1, this signal being inputted from the current-to-voltage converter 20, and supplies the decoded data to a controller 7. The controller 7 processes the inputted data appropriately and outputs the result to a host computer, not shown, as required.

The servo circuit 5 generates a focus servo control signal and a tracking servo control signal from the signal supplied from the current-to-voltage converter 20 and outputs the generated signals to the optical head 3. Further, the servo circuit 5 generates a spindle servo signal and outputs the generated spindle servo signal to the spindle motor 2.

The servo circuit 5 has plural registers 6 (only one of them is shown in FIG. 1 for the sake of simplicity). These registers 6 hold a value outputted from the current-to-voltage converter 17 or a value for controlling a drive current for the LD 11 supplied from the controller 7 or the host computer.

A signal encoder circuit 8 encodes record data supplied from the controller 7 to generate a write signal, which is outputted to the LDD 21. The LDD 21 drives the LD 11 based on this write signal.

Figure 2:
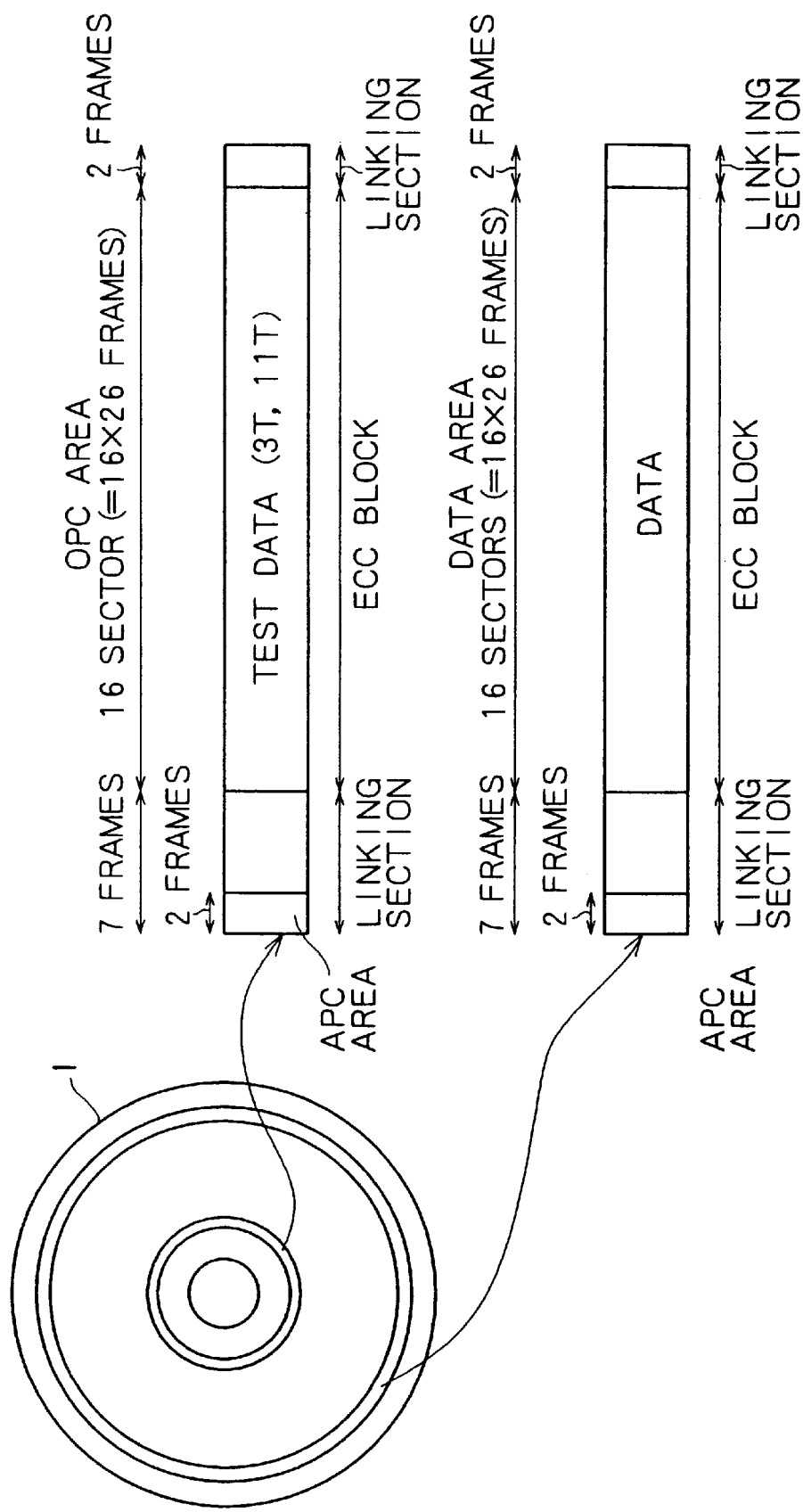
FIG. 2 is a diagram illustrating a format of a disc shown in FIG. 1.

FIG. 2 shows formats of various areas on the disc 1. As shown, an area in a predetermined range of the innermost periphery of the disc 1 is an OPC area and an area around the same is a data area. In each of these areas, recording and reproduction are made on an ECC block basis. One ECC block (32 KB) is composed of 16 sectors, one sector consisting of 26 frames. One frame consists of 91 bytes. Each ECC block is prefixed with a linking section consisting of about 7 frames, the first 2 frames or so thereof providing an APC area. Each ECC block is suffixed also with a linking section of about 2 frames. In each of the OPC area and the data area, data of pattern 1 or pattern 2 to be described with reference to FIGS. 5 and 6 is recorded in the APC area. For the ECC area, data of a minimum inversion interval (in this case, 3 T) and data of a maximum inversion interval (in this case, 11 T) are alternately recorded in the OPC area. In the ECC blocks in the data area, the primary data is recorded.

Figure 3:
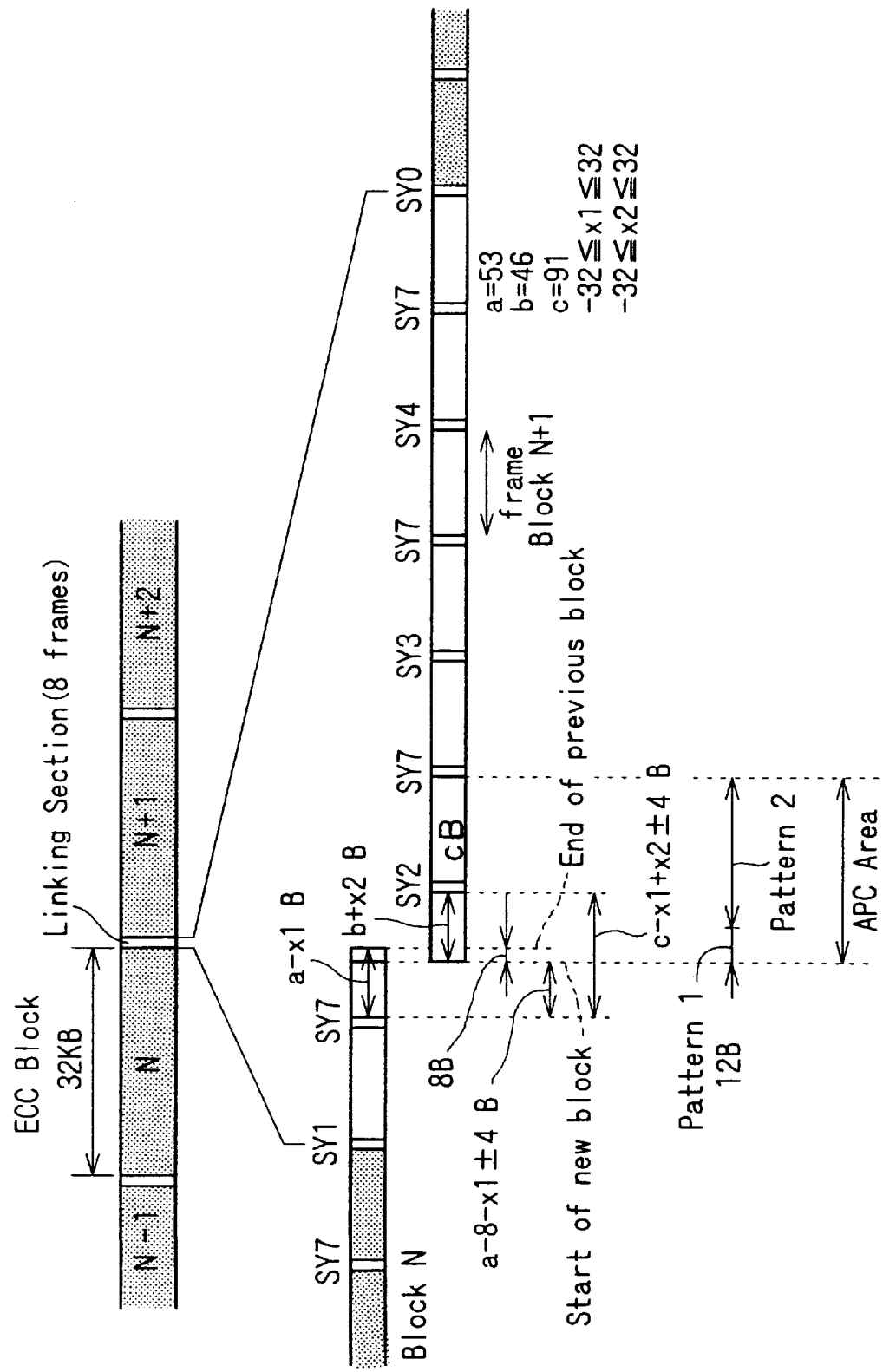
FIG. 3 is a diagram illustrating a data overlap recording area of an ECC block.

The disc 1 is controlled in its timing by the servo circuit 5 such that ECC blocks are recorded with the trailing linking section of an ECC block partially overlapped with the leading linking section of the following ECC block. FIG. 3 shows this relationship. As shown, a linking section having a standard length of 8 frames is formed between ECC blocks. Of these 8 frames, about 2 frames are attached to the end of each ECC block and about 7 frames are attached to the beginning of each ECC block.

In other words, when recording one ECC block, a linking section of about 7 frames is recorded, followed by data of one ECC block followed by a linking section of about 2 frames. When 2 ECC blocks are recorded consecutively, the number of frames constituting the linking section between these ECC blocks is just 8 frames. Namely, in this case, the preceding linking section is not overlapped by the succeeding linking section.

On the other hand, when recording a new ECC block behind an already recorded ECC block, the last frame of the linking section of the preceding ECC block is partially overlapped by the first frame of the linking section of the succeeding ECC block.

The end of each ECC block is recorded with sync SY1 followed by one frame of dummy data, which is followed by sync SY7 followed by dummy data having a length of 53 bytes ±x1. The value of this ±x1 is a predetermined value within a range of −32 through +32, this value being appropriately set by random number. Therefore, the length of the last linking section is a minimum of 21 (=53−32) bytes and a maximum of 85 (=53+32) bytes.

When recorded ECC block N is followed by new ECC block N+1, the length from the beginning of the linking section to a first sync SY2 is 46±x2 bytes. The value of this x2 is also set appropriately by random number. It should be noted that the polarity of x2 and the polarity of x1 are opposite to each other.

The beginning of the linking block of the following ECC block is written at a position 53+x1−8 bytes starting from the sync SY7 of the linking section of the preceding (recorded) ECC block. Therefore, an 8-byte-length area ahead from the end of the preceding linking section provides an area in which data are written in an overlapping manner. However, a jitter of ±4 bytes is allowed at the position from which data is written in the linking section, so that the length of this overlapped recording area is a minimum of 4 (=8−4) bytes and a maximum of 12 (=8+4) bytes. The length of the frame between the sync SY7 of the linking section of the preceding ECC block and the sync SY2 of the linking section of the succeeding ECC block is 91 (=53−8+46)x1+x2. When the jitter is included, this length produces an error of ±4 bytes.

The first sync SY2 of the start linking section of each ECC block is followed by sync SY7, sync SY3, sync SY7, sync SY4, sync SY7, and sync SY0 in this order. Behind the sync SY0, the ECC block is arranged.

The APC area is an area between the beginning of the start linking section of each ECC block to the first sync SY7. The first 12 bytes (the overlapped recording area of maximum length) of this APC area are written with the data of pattern 1 shown in FIG. 5 to be described later, the remaining area being written with the data of pattern 2.

Record marks of 4 T long and erase marks of 4 T long are alternately recorded in the other areas of the linking section; namely, a linking section of about 2 frames attached to the end of the ECC block and an area of 5 frames between the first sync SY7 in the linking section attached to the beginning of the ECC block and the first sync SY0 of the ECC block.

The following describes the operation of the preferred embodiment shown in FIG. 1. When the disc 1 is loaded on the optical disk apparatus, the controller 7 executes the processing indicated by the flowchart of FIG. 4 (the processing for recording test data on the OPC area in the innermost periphery of the disc 1 and reproducing this recorded data).

Namely, first, in step SI, the controller 7 initializes, to 1, variable n representing the number of steps for adjusting the intensity of the laser beam outputted from the LD 11.

Next, in step S2, the controller 7 sets parameters corresponding to variable n to a register 6 of the servo circuit 6. Namely, I cool_n, I write_n, and I erase_n are set to the register 6 (n=1 in this case). I cool_n represents the value of drive current (or drive voltage) of the LD 11 for generating a laser beam having an intensity during a cooling period. The intensity of the laser beam during this cooling period is represented in C in FIGS. 5A and 6A.

Parameter I write_n is expressed in the following equation:

$$I\ write\_n = I\ cool\_n + \Delta CW\_n$$

Parameter I write_n represents the value of a drive current (or drive voltage) for generating the laser beam having an intensity (represented in W in FIGS. 5A and 6A) necessary for causing the LD 11 to record data. In the above-mentioned equation, ΔCW_n is a constant and corresponds to a difference between parameters I write_n and I cool_n. To parameter I write_n, a value obtained by adding constant ΔCW_n to parameter I cool_n is set.

Parameter I erase_n denotes the value of a drive current (or drive voltage) to be supplied when generating the laser beam having an intensity (represented in E in FIGS. 5A and 6A) necessary for causing the LD 11 to erase data. This parameter is expressed in the following equation:

$$I\ erase\_n = I\ cool\_n + \Delta CE\_n$$

In the above-mentioned equation, ACE_n is a constant. To parameter I erase_n, a value obtained by adding this constant to parameter I cool_n is set.

These values are set to a register 61 of APC circuits 41-i to be described later with reference to FIG. 11. Since n=1 in this case, minimum values are set to the register 61.

In step S3, the controller 7 controls the servo circuit 5 to execute a write operation on an ECC block basis.

Namely, the servo circuit 5 controls the LDD 21 such that intensity C of the laser beam during the cooling period is specified by setting value I cool_1, intensity W of the laser beam for data recording is specified by setting value I write_1, and intensity E of the laser beam for data erasing is specified by setting value I erase_1.

As shown in FIG. 3, the controller 7 generates data of pattern 1 shown in FIG. 5 in the first 8-byte section of the APC area and data of pattern 2 shown in FIG. 6 in the remaining section of the APC area and supplies the generated data to the signal encoder circuit 8. The signal encoder circuit 8 converts the inputted data to corresponding write signals and supplies them to the LDD 21. As shown in FIG. 5, in pattern 1, a mark (record mark) having a length of minimum inversion interval (3 T), a mark (erase mark) having a length of minimum inversion interval, and a no signal section having a maximum inversion interval (11 T) are repeated in this order. As shown in FIG. 6, in pattern 2, a mark (record mark) having a minimum inversion interval and a mark (erase mark) having a maximum inversion interval are repeated in this order.

When a laser beam having a predetermined intensity is emitted from the LD 11, this laser beam is converted by the collimator lens 12 into a parallel beam, which is put into the objective lens 14 through the beam splitter 13 to be converged. The converged beam is radiated onto the disc 1. Consequently, the marks of pattern 1 of pattern 2 are formed in the APC area in the OPC area on the disc 1.

To record a mark (erase mark) of 3 T period after recording a mark (record mark) of 3 T period, three optical pulses are generated having intensity W for a period of 0.5 T and intensity C for the following period of 0.5 T during 3 T period, in principle. By outputting a laser beam having intensity E for 3 T erase period, an erase mark of 3 T period can be formed. However, radiation of the laser beam having intensity W heats up the disc 1 and it takes time for the disc 1 to cool down. Therefore, actually, as shown in FIG. 5A, the laser beam has intensity W for a period of 0.5 T, intensity C for a period of 0.5 T, intensity W for a period of 0.5 T, intensity C for a period of 1 T, and intensity E for a period of 3.5 T in this order. Consequently, as shown in FIG. 5E, record marks of 3 T and erase marks of 3 T can be recorded by phase change.

For the next period of 11 T, the laser beam has intensity C. This intensity c is greater than intensity R necessary for data reading but not large enough for recording a mark on the disc 1 and erasing a recorded mark. Therefore, the this period of 11 T is no-record area in which neither record mark nor erase mark is recorded.

Part of the laser beam emitted from the LD 11 is reflected from the beam splitter 13 to be put into the PD 16 through the lens 15. Therefore, the PD 16 outputs a signal corresponding to the intensity of the laser beam actually outputted from the LD 11. This signal is converted by the current-to-voltage converter 17 into a voltage signal to be supplied to the servo circuit 5. As shown in FIG. 5B, the servo circuit 5 applies APC servo so that the intensity (value I pcool outputted from the PD 16) of the laser beam emitted from the LD 11 matches the setting value I cool_1 as set in step S2 until the cooling period ends after a period of 1 T passed from start of the cooling period of 11 T long.

As shown in FIG. 5C, the servo circuit 5 also applies APC servo so that the intensity (value I perase__1 outputted from the PD 16) of the laser beam emitted from the LD 11 matches value I erase__1 set to the reference register 61 until the erase period of intensity E ends after a period of 1 T passed from setting of intensity E.

Further, as shown in FIG. 5D, the servo circuit 5 applies APC servo so that the intensity (value I pwrite__1 outputted by the PD 16) of the laser beam emitted from the LD 11 matches value I write__1 set in step S2 for a period of 1 T after a period of 1 T (in the timing at which the second laser beam of intensity W is generated) passed from generation of the laser beam of intensity W.

As shown in FIG. 5E, in a section in which it is possible that an ECC block is followed by another ECC block in an overlapped manner, a no-record area is formed. In this no-record area, data are not written in an overlapped manner. The no-record area is 11 T long, which is equal to a maximum inversion interval in a data recording area of 24 frames. This is a maximum length allowed by standard to exist as data. Therefore, this arrangement reduces the number of times data to be written to the disc 1 in the area in which data are written in an overlapped manner.

On the other hand, as shown in FIG. 6E, in the remaining section in the APC area, a record mark of 3 T section and an erase mark of 11 T section are recorded alternately. In principle, for this recording, a record mark of 3 T is formed by generating 3 optical pulses with intensity W for a period of 0.5 T and intensity C for a next period of 0.5 T and an erase mark is formed by generating a laser beam of intensity E for a period of 11 T. Actually, however, as described above, the heat accumulation effect of the optical disc 1 must be considered. This being the case, as shown in FIG. 6A, control is made so that 2 pulses are generated having intensity W for a period of 0.5 T and intensity C for a next period of 0.5 T, and then the intensity becomes E for a period of 12T. This allows recording of record marks each having a length of 3 T and erase marks each having a length of 11 T as shown in FIG. 6E.

As shown in FIG. 6C, in the section in which this pattern 2 is recorded, APC servo is applied so that the intensity (the output value I perase__1 of the PD 16) of laser beam outputted from the LD 11 becomes equal to the setting value I erase__1 set in step S2 while the laser beam having intensity E is continuously generated (until intensity E changes to intensity W) after a period of IT passed after the generation of the laser beam having intensity E started. Also, as shown in FIG. 6D, APC servo is applied so that the intensity (the output I pwrite__1 of the PD 16) of the laser beam outputted from the LD 11 becomes equal to the setting value I write__1 set in step S2 during a period of 1 T after a second generation of the laser beam having intensity W started.

As shown in FIG. 6B, no APC operation is executed during the cooling period. The result of the APC servo for the laser beam having intensity C during the cooling period in the section of pattern 1 is held without change.

It should be noted that, as shown in FIGS. 5 and 6, the timing of starting an APC operation is delayed by 1 T to start the APC operation after the stabilization of the operation.

In the data recording area of 24 frames following the APC area, a record mark of 3 T and an erase mark of 11 T are alternately recorded as test data. It should be noted that, in this data recording area of 24 frames, no APC control is executed, the intensity in the last cooling period, write period, or erase period of the APC area being held without change (however, an APC operation may be executed in the write period and the erase period if required).

When one ECC block of data has been recorded as described above, the output I pcool__1 of the PD 16 immediately before completion of the recording is held in the register 6 of the servo circuit 5.

Next, in step S4, the controller 7 determines whether variable n is 8 or not. Since n=1 in this case, variable n is incremented by 1 in step S5, n becoming 2.

Then, back in step S2, the controller 7 sets setting values I cool__2, I write__2, and I erase__2 corresponding to n=2 to the reference register 61 of the servo circuit 5. These values are somewhat larger than those with n=1.

In step S3, the same write operation as described above is executed.

This write operation is repeated until n=8 has been reached in step S4. Namely, in this example, the write operations for 8 different pieces of data have been executed.

FIG. 7 shows a state in which data of ECC block (n) and data of next ECC block (n+1) are written as described above.

As shown FIG. 7B, the values to be set to the reference register are values corresponding to n in the ECC block (n) shown in FIG. 7A and to (n+1) in the ECC block (n+1).

As shown in FIG. 7C, in the section of pattern 1, an APC operation is executed at all intensities of C, E, and W. In the section of pattern 2, the APC operation is held at intensity C and only executed at intensities E and W. In the linking section of 5 frames and the following ECC block, the APC operation is held at all intensities.

Consequently, as shown in FIG. 7D, the level of intensity C of the LD 11 is adjusted to the value set in step S2 in the section of pattern 1.

On the other hand, as shown in FIGS. 7E and 7F, the levels of the LD 11 of intensities E and W cannot be fully adjusted to the value set in step S2 in the section of pattern 1. This is because the APC section for intensities E and W is extremely shorter than the APC section of intensity C.

Therefore, as shown in FIG. 6, in pattern 2, a total time of the APC operation of intensities E and W is made longer. Consequently, in the section of pattern 2, the levels of the LD 11 of intensities E and W can be adjusted to the value set in step S2.

FIG. 7G shows processing in which the value I pcool__n outputted from the PD 16 is stored in the register at a time when the APC operation of pattern 2 of ECC block (n) has ended. FIG. 7H shows processing in which the value I pcool__n+1 outputted from the PD 16 is stored in the register at a time when the APC operation of pattern 2 of ECC block (n+1) has ended. It should be noted that constants $\Delta CW\_n$ and $\Delta CE\_n$ may be stored in the register as required.

In the processing example shown in FIG. 4, since n=8, the results of processing of 8 ECC blocks are held in 8 registers 6.

Now, referring to FIG. 4 again, when the test data has been all written for 8 ECC blocks as described above, then, in step S6, the controller 7 controls the servo circuit 5 to set value I read__default as setting value I read to the reference register for setting intensity R of the laser beam for data reproduction. This value I read__default is a value set on the controller 7 beforehand as default. The servo circuit 5 monitors the output I pread of the PD 16 and applies APC servo so that the intensity (the output I pread of the PD 16) of the laser beam emitted from the LD 11 becomes equal to the setting value I read held in the reference register of the register 6 in the servo circuit 5.

Then, the controller 7 reproduces the data of the 8 ECC blocks for which the write operation was executed in step S3.

The laser beam reflected from the disc 1 is put into the beam splitter 13 through the objective lens 14 to be reflected. The reflected laser beam is converged by the lens 18 to be put into the PD 19. A current signal outputted from the PD 19 is converted by the current-to-voltage converter 20 into a voltage signal to be supplied to the servo circuit 5. Using this input, the servo circuit 5 executes evaluation processing in step S7 and subsequent steps. The servo circuit 5 also stores the signal I pread outputted from the PD 16 into the register 6 as value I read_opc when reading data from each ECC block.

In step S7, the servo circuit 5 initializes the first change ratio (at n=1) (to be described later) as the best change ratio; namely, the change ratio is initialized as m=1.

Next, in step S8, the servo circuit 5 sets n=2. Further, in step S9, the servo circuit 5 determines whether the change ratio n (in this case n=2) is better than the best change ratio (change ratio of n=1). The change ratio herein denotes a change in the ratio of signal level A3 of a record mark having a length of 3 T recorded in the data area of 24 frames to signal level A11 of an erase mark having a length of 11 T (namely, A3/A11). This change ratio gradually increases as the value n increases from 1 to 8 sequentially as shown in FIG. 8. After reaching its peak, this change ratio decreases. Here, the change ratio after the peak is detected as the best change ratio.

In step S9, if the change ratio of n (n=2 in this case) is found better than the best change ratio (n=1 in this case), then in step S10, the change ratio of n is substituted into the best change ratio; namely, m=n (in this case, m=2). If the change ratio of n is found not better than the best change ratio in step S9, the processing of step S10 is skipped.

In step S11, the servo circuit 5 determines whether n=8 or not. If n is found other than 8, then in step S12, n is incremented by 1. Then, the processing of step S9 and subsequent processing are repeated.

If n is found 8 in step S11, then in step S13, value I cool_m is set to value I cool_init. Also, value ΔCE_m is set to value ΔCE_init and value ΔCW_m is set to ACW_init.

Thus, the test data is recorded on the OPC area while changing intensities of the LD 11 and the recorded data is reproduced, thereby obtaining optimum LD 11 intensities C (I cool_init), E (I erase_init=I cool_init+ΔCE_init), and W (I write_init=I cool_init+ΔCW_init).

Figure 9:
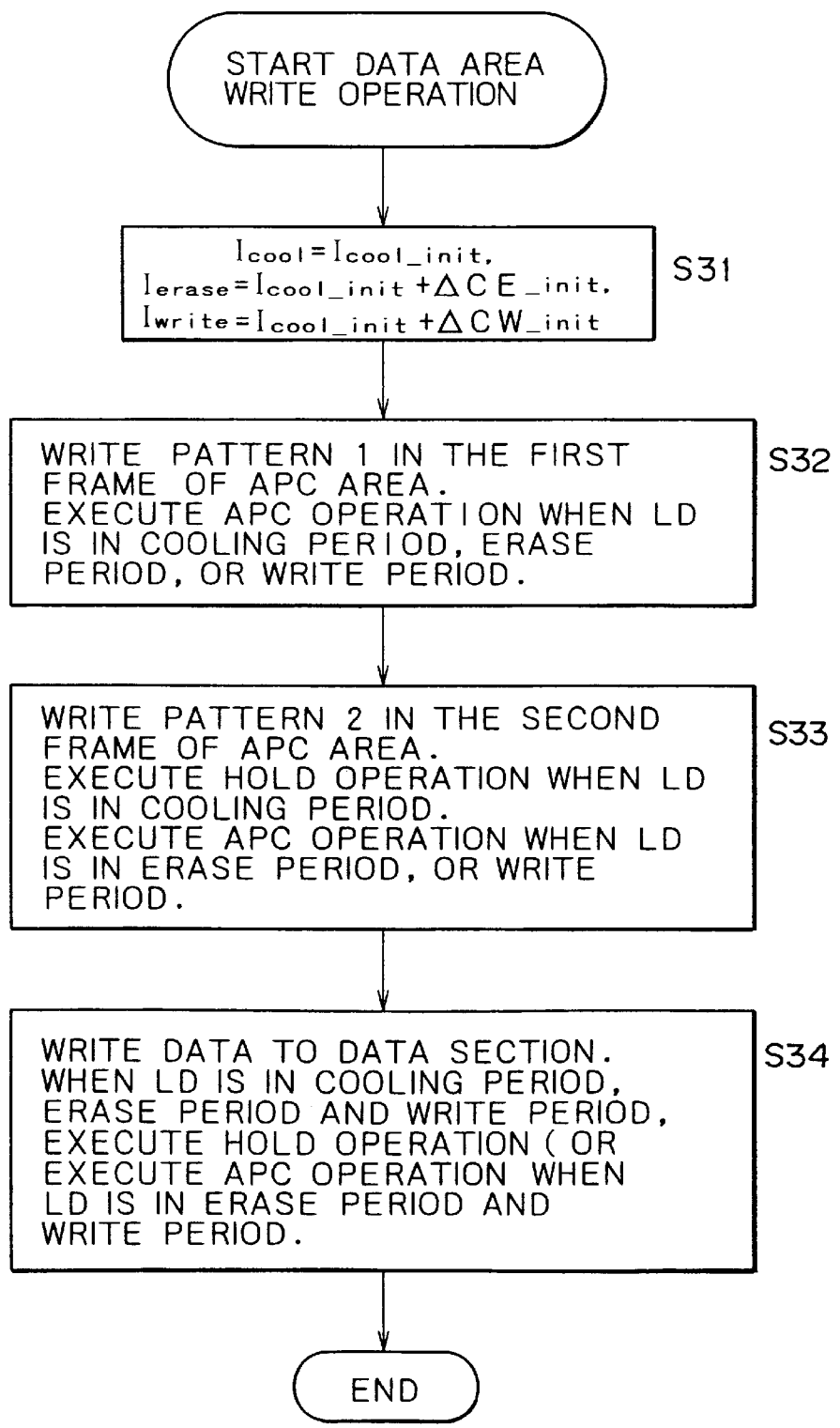
FIG. 9 is a flowchart describing processing for writing data to a data area.

Next, the writing of primary data to the disc 1 is indicated, the processing shown in the flowchart of FIG. 9 is executed. First, in step S31, the servo circuit 5 sets the value I cool_init obtained in step S13 of FIG. 4 to the setting value I cool held in the reference register for controlling the APC operation during the cooling period. The servo circuit 5 also sets a value obtained by adding the value ΔCE_init obtained in step S13 to value I cool_init (namely, I cool_init+ΔCE_init) to the setting value I erase of the reference register for APC control of the erase period. Further, the servo circuit 5 sets a value obtained by adding the value ΔCW_init obtained in step S13 of FIG. 4 to value I cool_init to the setting value I write of the reference register for APC control of the write period.

Next, in step S32, the controller 7 generates data of pattern 1 in the overlapped writing area of the APC area in the data area and inputs the generated data into the signal encoder 8 that converts the inputted data into a write signal. The LDD 21 controls the LD 11 according to this write signal, causing the same to emit the laser beam of a predetermined intensity. At this moment, the servo circuit 5 executes the above-mentioned APC operation in each of cooling period, erase period, and write period. Namely, APC servo is applied so that, in cooling period, erase period, and write period, the signals I pcool, I perase, and I pwrite outputted from the PD 16 become equal to the values I cool, I erase, and I write set in step S31.

In step S33, the controller 7 generates data of pattern 2 in the other periods of the APC area and supplies the generated data to the signal encoder 8 that converts the inputted data into a write signal. The servo circuit 5 puts the APC circuit in the hold state in the cooling period and executes an APC operation in the erase or write period.

In step S34, the controller 7 generates data to be written to the data recording area. The generated data is converted by the signal encoder 8 into a write signal to be supplied to the LDD 21. Based on this write signal, the LDD 21 controls the LD 11 to generate the laser beam having an intensity corresponding to the record data. At this moment, the servo circuit 5 puts the APC circuit (to be described with reference to FIG. 11) in the hold state in each cooling period, erase period, and write period. Alternatively, the APC operation may be executed only in erase period and write period as required.

Figure 10:
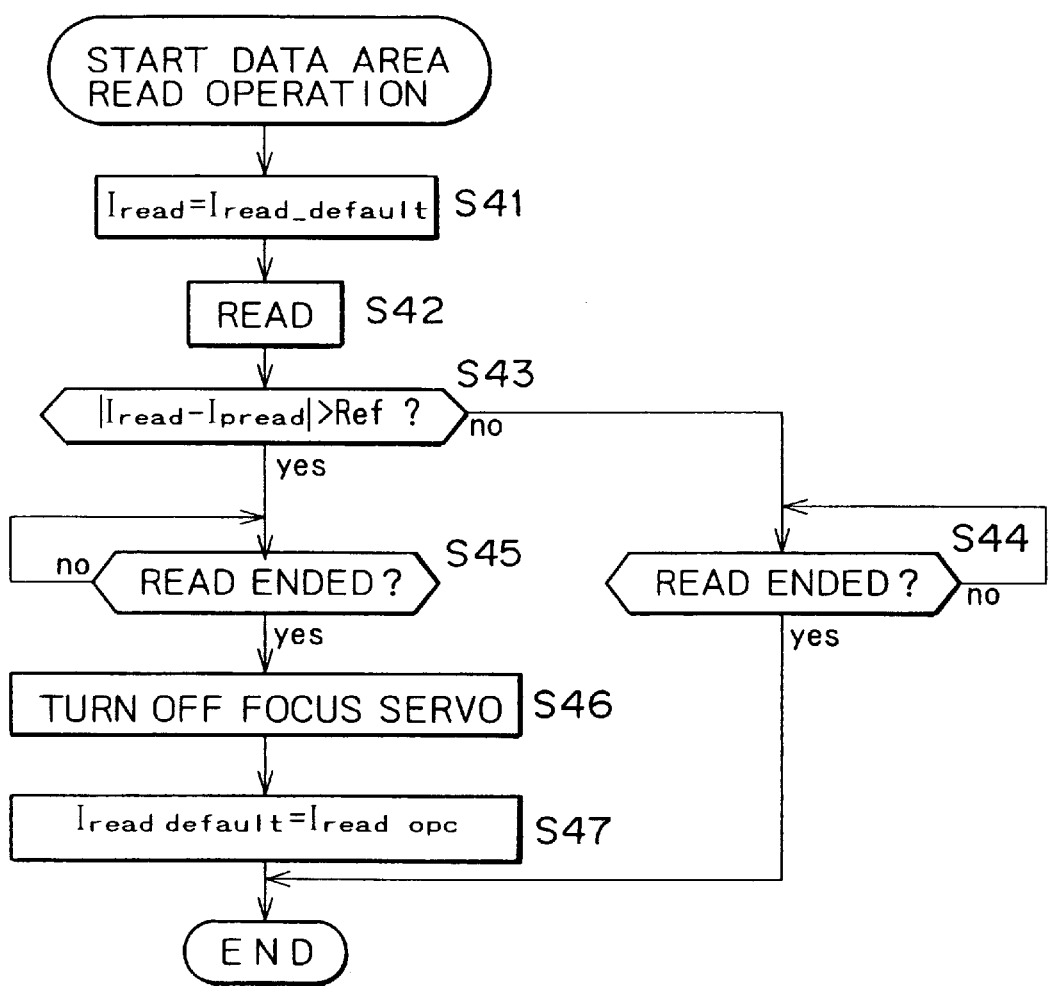
FIG. 10 is a flowchart describing an operation for reading data from the data area.

Next, when reproduction of data recorded in the data area of the disc 1 is indicated, processing shown in the flowchart of FIG. 10 is executed. First, in step S41, the servo circuit 5 sets prepared value I read_default to the value I read of the reference register 61 of a reproduction APC circuit (an APC circuit 41-2 to be described with reference to FIG. 11). Then, in step S42, a read operation is executed. Namely, at this moment, the servo circuit 5 applies APC servo so that the value I pread outputted from the PD 16 matches the value I read set to the reference register in step S41. At the same time, a reproduction signal outputted from the PD 19 is converted by the current-to-voltage converter 20 into a voltage signal, which is supplied to the signal reproducing/decoding circuit 4. The signal reproducing/decoding circuit 4 decodes the inputted signal and outputs the decoded signal to the controller 7. The controller 7 outputs the inputted reproduced data to the host computer, not shown.

In step S43, the servo circuit 5 determines whether the absolute value of the difference between the value I pread outputted from the PD 16 and the value I read set to the reference register is larger than a preset reference value Ref. If this absolute value is found not larger than the reference value Ref, then in step S44, the servo circuit 5 waits until the read operation ends, upon which the processing comes to an end.

In step S43, if the absolute value of the difference between the values I read and I pread is found larger than the reference value Ref, then in step S45, the servo circuit 5 waits until the read operation ends, upon which the servo circuit 5 turns off focus servo in step S46. Then, in step S47, at the read operation, the servo circuit 5 sets value I read_opc that was set when reproducing the data written to the OPC area in step S6 of FIG. 4 to value I read_default to be initialized in step S41. Since this value I read_opc is a value in the case where data was actually read in the OPC area to obtain an optimum result, the adjustment of this value can obtain a proper light quantity for data reproduction if the relationship between the drive current of the LD 11 and the quantity of the beam to be actually generated changes due to a change in the use environment of the optical disc apparatus.

Figure 11:
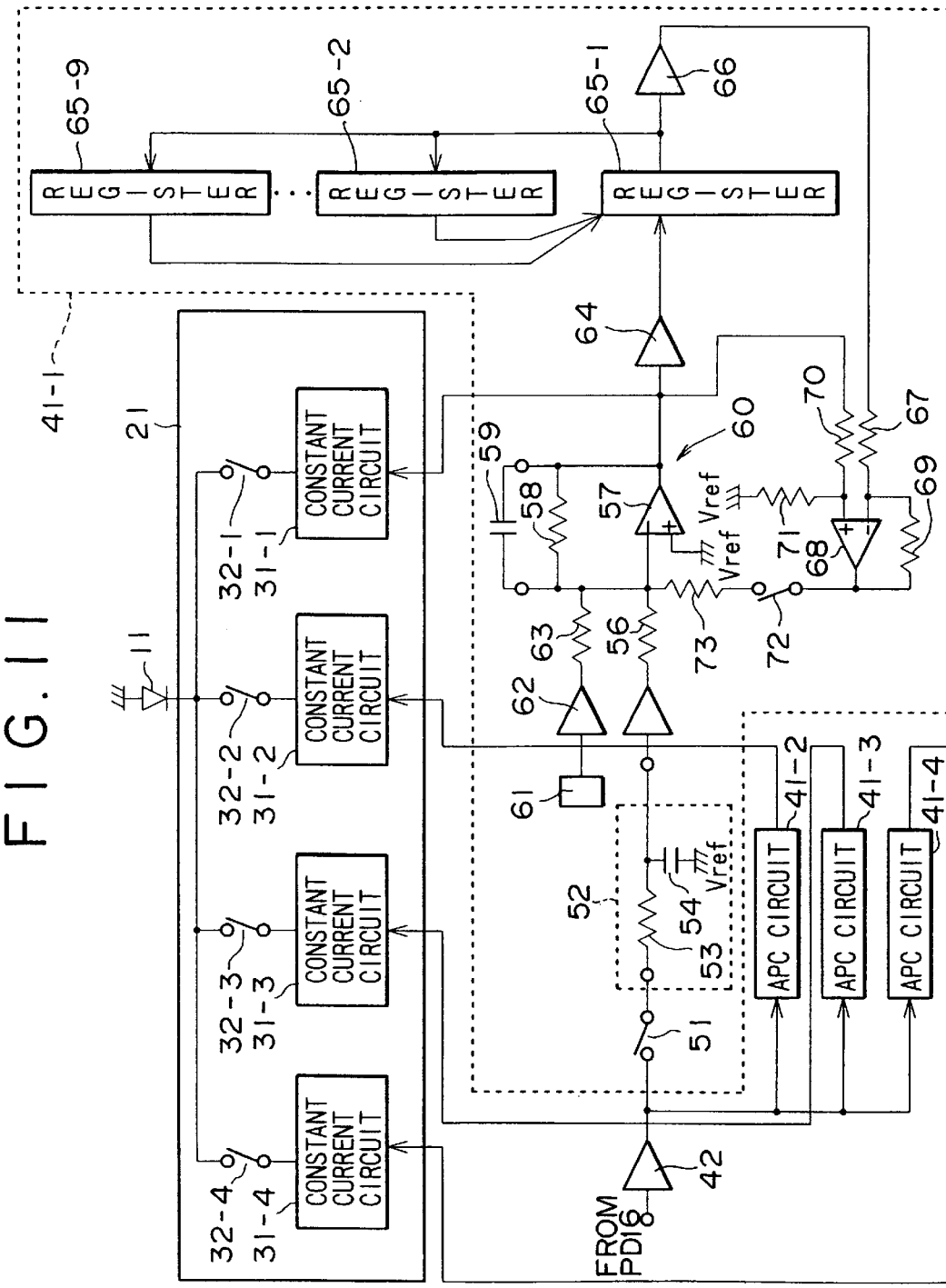
FIG. 11 is a circuit diagram illustrating a constitution of an APC circuit.

FIG. 11 illustrates a constitution of the APC circuit included in the servo circuit 5, by way of example. In this example, the APC circuit 41-1 executes the APC operation in cooling period, the APC circuit 41-2 executes the APC operation in reproduction (read) period, and the APC circuit 41-3 executes the APC operation in erase period, and the APC circuit 41-4 executes the APC operation in write period. The current signal outputted from the PD 16 is converted by the current-to-voltage converter 17 into a voltage signal, which is inputted in these APC circuits 41-1 through 41-4 via a buffer amplifier 42.

In the APC circuit 41-1, the signal supplied from the buffer amplifier 42 is supplied to a hold circuit 52 through a switch 51. The hold circuit 52 is composed of a resistor 53 and a capacitor 54. The output of the hold circuit 52 is supplied to the inverted input terminal of an operational amplifier 57 constituting an integrator 60 through a buffer amplifier 55 and a resistor 56. The output of the reference register 61 is converted by a D/A converter 62 into an analog signal, which is also inputted in the inverted input terminal of the integrator 60 through a mixing resistor 63.

The output of the operational amplifier 57 is inputted in the inverted input terminal through a parallel circuit composed of a resistor 58 and a capacitor 59. The non-inverted input terminal of the operational amplifier 57 is grounded.

The output of the operational amplifier 57 is also connected to the non-inverted input terminal of an operational amplifier 68 through a resistor 70. The non-inverted input terminal of the operational amplifier 68 is grounded through a resistor 71. The output of the operational amplifier 68 is also connected to the inverted input terminal of the operational amplifier 57 through 8 switches 72 and a resistor 73. The output of the operational amplifier 68 is connected to its inverted input terminal through a resistor 69.

The output of the operational amplifier 57 is converted by an A/D converter 64 into a digital signal, which is supplied to a register 65-1. The output of the register 65-1 is converted by a D/A converter 66 into an analog signal, which is connected to the inverted input terminal of the operational amplifier 68 through a resistor 67. The output of the register 65-1 is also connected to 8 registers 65-2 through 65-9. The output of each of the registers 65-2 through 65-9 is loaded into the register 65-1.

The output of the operational amplifier 57 is supplied to a constant current circuit 31-1 for the cooling period of the LDD 21. The constant current circuit 31-1 generates a constant current corresponding to the output of the operational amplifier 57 to drive the LD 11 through a switch 32-1.

Although not shown, APC circuits 41-2 through 41-4 each have generally the same constitution as that of the APC circuit 41-1. The output of the APC circuit 41-2 is supplied to a constant current circuit 31-2 for reproducing period, the output of the APC circuit 41-3 is supplied to a constant current circuit 31-3 for erase period, the output of the APC circuit 41-4 is supplied to a constant current circuit 31-4 for write period. The output of the constant current circuit 31-2 is supplied to the LD 11 through a switch 32-2 which is turned on in reproducing period, the output of the constant current circuit 31-3 is supplied to the LD 11 through a switch 32-3 which is turned on in erase period, and the output of the constant current circuit 31-4 is supplied to the LD 11 through a switch 32-4 which is turned on in write period.

The following describes the operations of the APC circuits. At data recording in the OPC area, the above-mentioned I cool_1 is set in reverse polarity to the register 61. The signal I pcool_1 to be outputted from the PD 16 in cooling period is supplied to the APC circuit 41-1 through the buffer amplifier 42. The switch 51 is turned off when a hold operation is executed and turned on when an APC operation is executed. When the switch 51 is on, the signal inputted through the buffer amplifier 42 is supplied to the integrator 60 through a smoothing circuit 52, a buffer amplifier 55, and a resistor 56. Value −I cool_1 set to the register 61 is converted by the D/A converter 62 into an analog signal, which is inputted in this integrator 60 through the resistor 63. Therefore, the integrator 60 integrates the difference between I pcool_1 and −I pcool_1. The result of the integration is converted by the A/D converter 64 into a digital signal, which is supplied to the register 65-1 to be held therein. This data is then transferred to the register 65-2 to be held therein.

Likewise, when n is 2 through 8, values I cool_2 through I cool_8 are stored in the register 61. The output of the register 65-1 to be outputted at each of these values is transferred to each of the registers 65-3 through 65-9 and held therein.

When 8 sampling values have been held in the registers 65-2 through 65-9 in the OPC area, a best value is transferred from one of the registers 65-2 through 65-9 to the register 65-1 to be held therein.

Subsequently, the switch 72 is turned on when data recording is first executed in the data area for example. The value held in the register 65-1 is converted by the D/A converter 66 into an analog signal to be inputted in the inverted input terminal of the operational amplifier 68. The output of the integrator 60 is supplied to the non-inverted input terminal of the operational amplifier 68. Therefore, the difference between them is computed by the operational amplifier 68 to be inputted in the non-inverted input terminal of the operational amplifier 57 through the switch 72 and the resistor 73. This charges the capacitor 59 of the integrator 60. At the same time, APC servo is applied so that the output of the integrator 60 (namely, the output of the operational amplifier 57) becomes equal to the value (the D/A converted value converted by D/A converter 66) held in the register 65-1.

The output of the integrator 60 is thus set to a predetermined value once, upon which -the switch 72 is turned off. Therefore, subsequently, the difference between the signal inputted from the buffer amplifier 42 and the reference value held in the register 61 in reverse polarity is integrated by the integrator 60. The result is supplied to the constant current circuit 31-1, from which the constant current of a predetermined value is outputted. This output is then supplied to the LD 11 through the switch 32-1. The LD 11 is driven by an optimum value held in one of the registers 65-2 through 65-9.

Thus, APC servo is applied so that intensity C in the cooling period of the LD 11 becomes equal to the value I cool set to the register 61. At the same time, when a hold operation is executed, the switch 51 is turned off to hold the output of the buffer 42 immediately before the turning off of the switch is held in the capacitor 54. APC servo is executed with this held value.

The similar operations are executed for the APC circuits 41-2 through 41-4.

Figure 12:
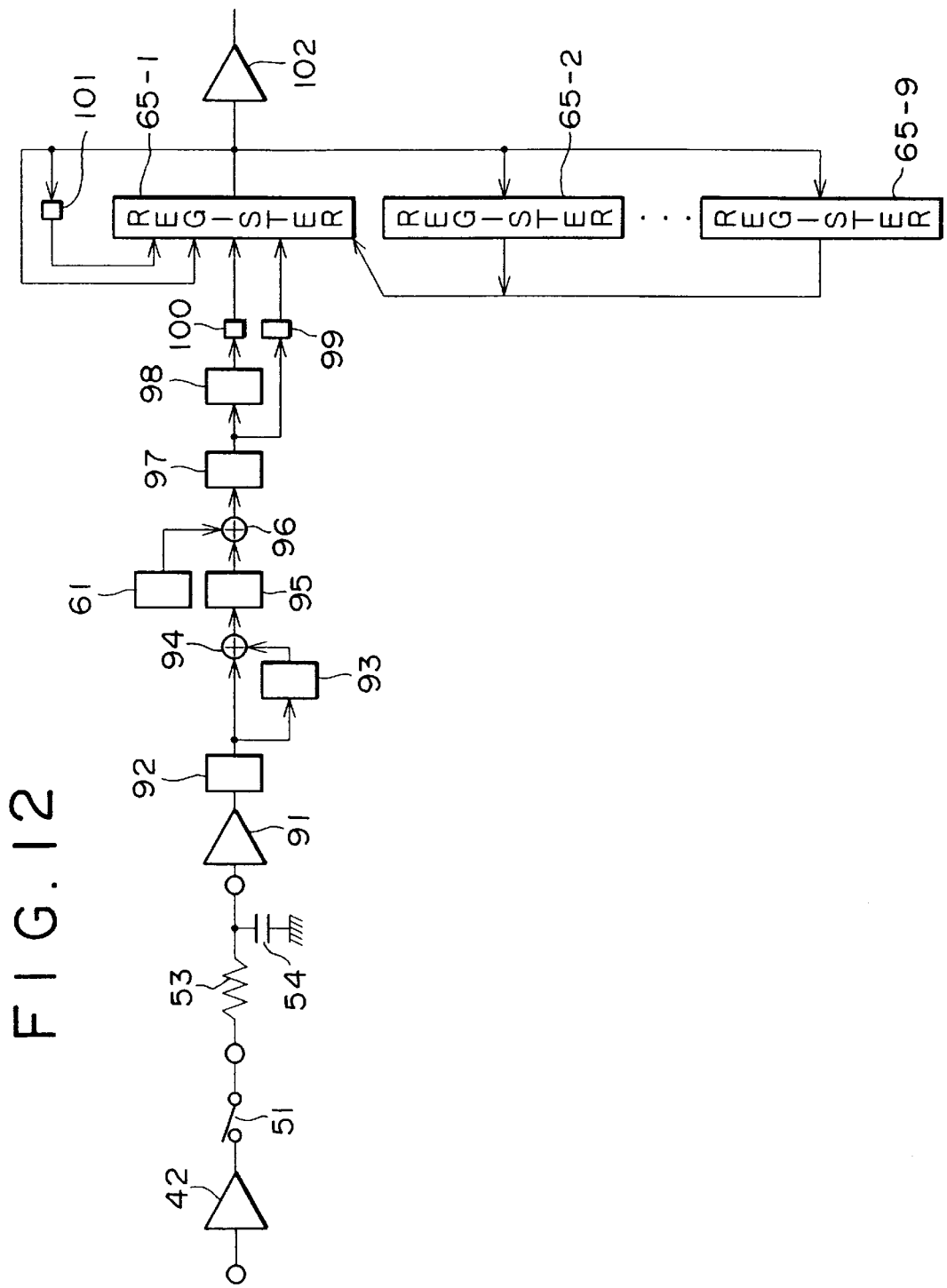
FIG. 12 is a circuit diagram illustrating another constitution of the APC circuit.
Figure 13:
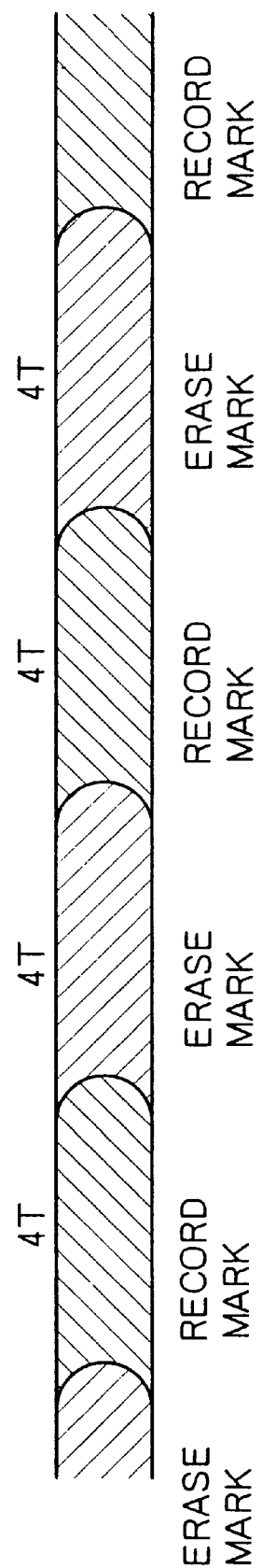
FIG. 13 is a diagram illustrating a state in which data are recorded in a conventional APC area.

In the example shown in FIG. 11, the integrator 60 in the APC circuit 41-1 is constituted in an analog manner. Alternatively, this integrator may be constituted in a digital manner. FIG. 12 is a block diagram illustrating the integrator constituted in a digital manner, by way of example. It should be noted that FIG. 12 shows only the constitution of the APC circuit 41-1; the other APC circuits 41-2 through 41-4 have the same constitution.

In the example of FIG. 12, the output of the smoothing circuit 52 is converted by an A/D converter 91 into a digital signal, which is supplied to a register 92 to be held therein. The output of the register 92 is supplied to a subtractor 94 and, at the same time, is held in the register 93 to be delayed and supplied to the subtractor 94. Therefore, the offset component is canceled by the subtractor 94.

The output of the subtractor 94 is supplied to a register 95 to be held therein. The output of the register 95 is supplied to a subtractor 96, by which the reference value held in the register 61 is subtracted. The output of the subtractor 96 is supplied to a register 97 to be held therein. The output of the register 97 is supplied to a following register 98 and, at the same time, to a bit shifter 99 to be bit-shifted. The output of the bit-shifter 99 is supplied to the register 65-1. The data held in the register 98 is also bit-shifted by a bit shifter 100 to be supplied to the register 65-1.

The register 65-1 holds its output, data obtained by bit-shifting its output by a bit-shifter 101, the output of the bit shifter 100, or the output of the bit shifter 99 and outputs the held data. The digital integrator is composed of the above-mentioned registers 97, 98, 65-1, bit shifters 99, 100, and 101.

The output of the register 65-1 is also converted by a D/A converter 102 into an analog signal, which is supplied to the constant current circuit 31-1.

So far, the present invention has been described by use of an optical disc for example. It will be apparent that the present invention is also applicable to the recording of information optically onto an information recording medium other than the optical disc.

The programs for executing the above-mentioned various processing operations are provided to users not only in recording media such as a magnetic disc and a CD-ROM but also by a transmission medium such as a network. In the latter case, the transmitted programs are then stored in a recording medium such as a magnetic disc or a solid memory for use.

As described and according to the invention, the intensity of light is adjusted so that a first area with information recorded, a second area with information erased, and a third area with information neither recorded nor erased are formed in an area in which information is at least recorded in an overlapping manner. This novel setup reduces the number of times information is recorded in an area in which information is recorded in an overlapping manner as compared with the other information recording areas, thereby minimizing a damage to the area in which information is recorded in an overlapping manner.

While the preferred embodiments of the present invention have been described using specific terms, such description is for illustrative purposes only, and it is to be understood that changes and variations may be made without departing from the spirit or scope of the appended claims.

What is claimed is:

1. An information recording/reproducing apparatus that radiates a laser beam to an information recording medium for recording and/or reproducing information, comprising:
   a laser beam generating means for generating a laser beam that records information to or reproduces information from said information recording medium;
   a timing control means for controlling information recording timing so that a recording area on a track of said information recording medium is followed by another recording area in a partially overlapping manner; and
   a laser beam intensity control means for controlling an intensity of the laser beam generated by said laser beam generating means so that a first area with information recorded, a second area with information erased, and a third area with information neither recorded nor erased are formed in the recording area in which information is at least recorded in an overlapping manner.

2. The information recording/reproducing apparatus as claimed in claim 1, wherein the length of said first area and the length of said second area are each equal to the length of a minimum inversion interval of said information and the length of said third area is equal to the length of a maximum inversion interval of said information.

3. The information recording/reproducing apparatus as claimed in claim 2, wherein said laser beam intensity control means controls the laser beam intensity so that said recording area in which said first area and said second area each having said minimum inversion interval and said third area having said maximum inversion interval is followed by a recording area in which a fourth area having a minimum inversion area with information recorded and a fifth area having a maximum inversion interval with information erased.

4. The information recording/reproducing apparatus as claimed in claim 1, wherein said information recording medium is an optical disc of phase change type and said recording area in which said first area, said second area, and said third area are formed is an automatic power control area.

5. An information recording/reproducing apparatus that radiates a laser beam to an information recording medium for recording and/or reproducing information, comprising:
   a laser diode for generating said laser beam for recording information to or reproducing information from said information recording medium;
   a converging means for converging said laser beam generated by said laser diode toward said information recording medium;
   a photodetector for receiving the laser beam reflected from said information recording medium;
   a spindle motor for rotatably driving said information recording medium;
   a servo circuit for controlling information recording timing so that a recording area on a track of said information recording medium is followed by another recording area in a partially overlapping manner; and
   a laser beam intensity control means for controlling the intensity of said laser beam generated by said laser diode so that said laser beam is radiated to the recording area in which information is at least recorded in an overlapping manner by a first laser power for recording information, a second laser power for erasing information, and a third laser power lower than those of said first laser power and said second laser power.

6. The information recording/reproducing apparatus as claimed in claim 5, wherein the length of a first area to which the laser beam having said first laser power is radiated and the length of a second area to which the laser beam having said second laser power are each equal to the length of a minimum inversion interval of said information and the length of a third area to which the laser beam having said third laser power is equal to the length of a maximum inversion interval of said information.

7. The information recording/reproducing apparatus as claimed in claim 5, wherein said laser beam intensity control means controls the intensity of the laser beam so that the recording area in which said first area and said second area each having said minimum inversion interval and said third area having said maximum inversion interval are formed is followed by a recording area in which a fourth area having a minimum inversion interval with information recorded and a fifth area having a maximum inversion interval with information erased are formed.

8. The information recording/reproducing apparatus as claimed in claim 5, said information recording medium is an optical disc of phase change type in which a state of crystals forming a recording layer of said information recording medium changes according to the intensity of the laser beam radiated thereto and said third laser power has an intensity that substantially does not change said state of crystals forming said recording layer.

9. The information recording/reproducing apparatus as claimed in claim 5, wherein said servo circuit further outputs a spindle servo signal for controlling the rotation of said spindle motor.

10. The information recording/reproducing apparatus as claimed in claim 5, wherein said servo circuit still further outputs, based on a detection signal supplied from said photodetector, a control signal for controlling the converging of the laser beam by said converging means.

11. An information recording/reproducing method comprising the steps of:

generating a light for recording information to or reproducing information from an information recording medium;

controlling an information recording timing so that a recording area on a track of said information recording medium is followed by another recording area in a partially overlapping manner; and controlling the intensity of light so that a first area with information recorded, a second area with information erased, and a third area with information neither recorded nor erased are formed in the recording area in which information is at least recorded in an overlapping manner.

* * * * *